Feb. 17, 1970        C. O. OTTEN        3,495,690
SMALL ENGINE TEST BRAKE ATTACHMENT
Filed Jan. 16, 1968        2 Sheets-Sheet 1
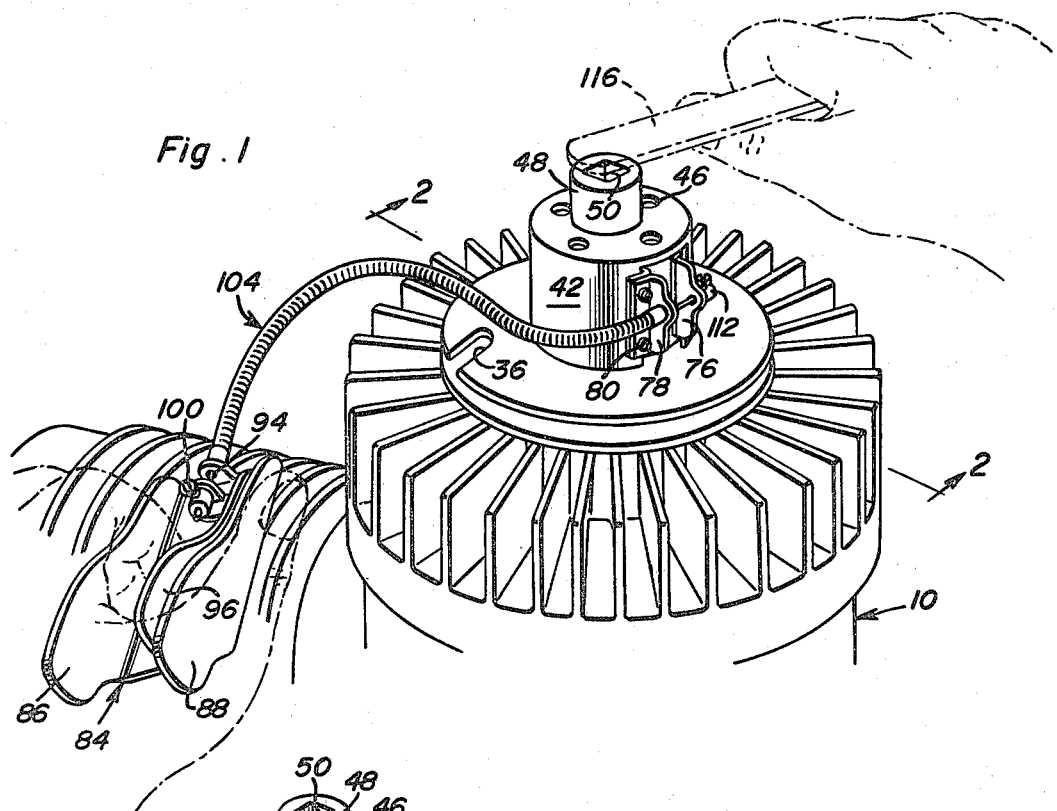
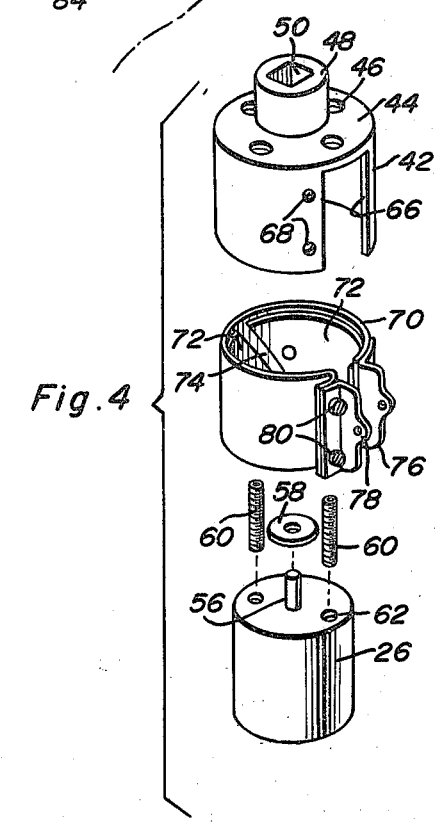
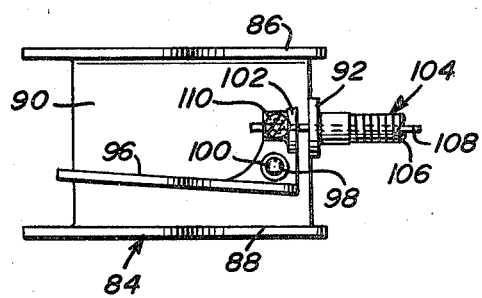
Calvin O. Otten
INVENTOR.

Feb. 17, 1970          C. O. OTTEN          3,495,690
SMALL ENGINE TEST BRAKE ATTACHMENT
Filed Jan. 16, 1968                        2 Sheets-Sheet 2
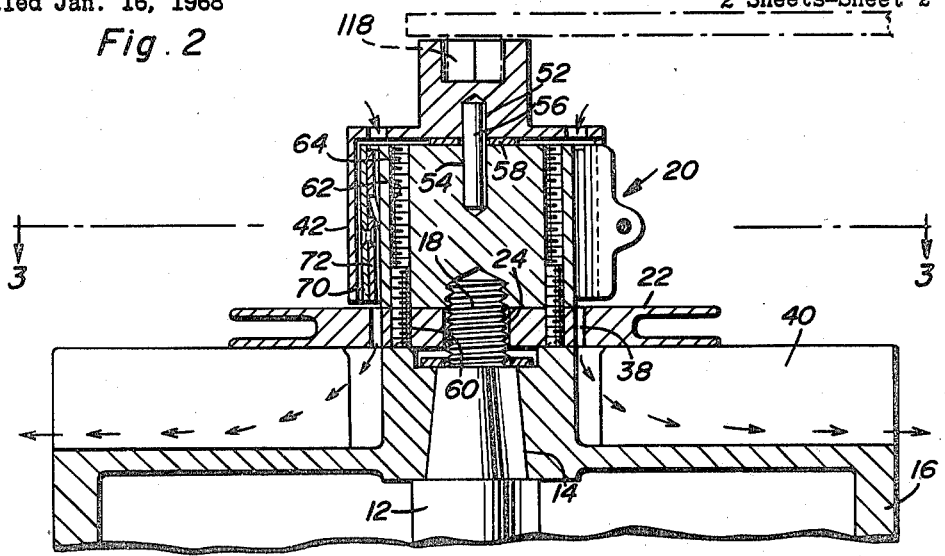
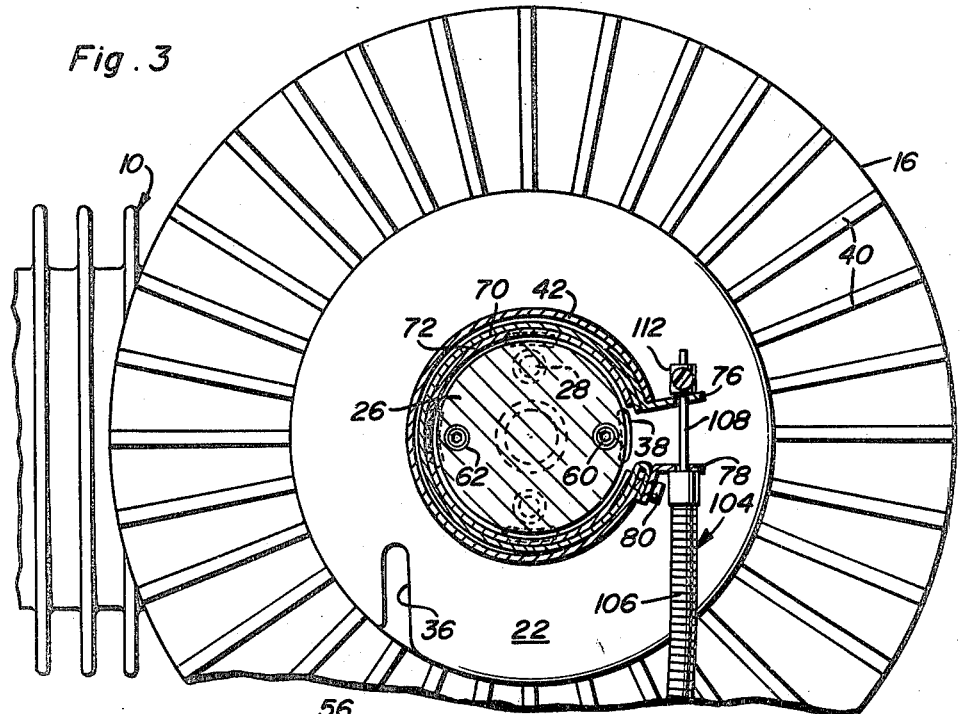
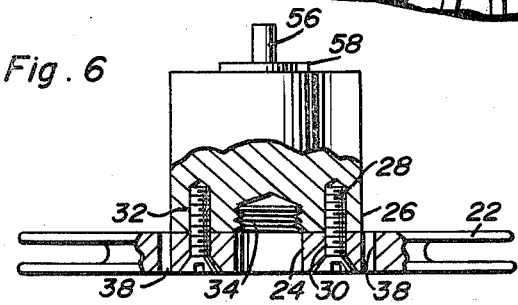
Calvin O. Otten
INVENTOR.

United States Patent Office 3,495,690
Patented Feb. 17, 1970

3,495,690
SMALL ENGINE TEST BRAKE ATTACHMENT
Calvin O. Otten, Otterville, Mo., assignor of one-half to
Aubrey D. Bixler, Tipton, Mo.
Filed Jan. 16, 1968, Ser. No. 698,297
Int. Cl. F16d 51/02, 55/68, 11/06
U.S. Cl. 188—77                8 Claims

ABSTRACT OF THE DISCLOSURE

Drum means including outer brake surface portions removably mounted on a rotatable shaft for rotation therewith and encircled by a sleeve adapted to be stationarily positioned for rotation of the shaft drum means relative thereto with the sleeve including circumferentially contractible split brake band having an inner surface defining a brake lining surface and disposed within the sleeve about the drum means, the band being connected to the sleeve for preventing uncontrolled rotation of the band relative to the sleeve and means being provided and connected to the band for selectively circumferentially contracting the latter about the drum means so as to brake the shaft relative to the stationary sleeve.

---

The brake attachment of the instant invention has been designed primarily for the purpose of placing a load on the rotatable output shaft of a motor or engine such as small capacity electric motors or internal combustion engines. The brake attachment may thus be utilized to simulate a load on the output shaft of an electric motor or an internal combustion engine in order that certain test operations may be performed on the electric motor and internal combustion engine while they are operating under load. However, it is of course also contemplated that the brake attachment of the instant invention may be readily adapted for use in conjunction with various other rotatable shafts for selectively braking the same.

The brake attachment includes a cylindrical drum adapted for securement to a large percentage of the rotatable output shaft of small electric motors and internal combustion engines and a sleeve positionable about the drum including internal circumferentially contractible brake band means for braking the drum relative to the sleeve, the latter being provided with means adapted to have one end of an elongated lever removably secured thereto.

The brake drum portion and sleeve portions of the test brake include coacting bearing means for concentrically journalling the sleeve means from the brake drum means and an operator is provided for contracting the brake band means from a remote location and operatively connected to the brake band means by means of an elongated flexible member thereby enabling the operator or actuator of the brake band to be controlled from the free end of an elongated lever removably attached to the sleeve.

The main object of this invention is to provide a small test brake attachment for the rotatable output shaft of small capacity electric motors and internal combustion engines.

Another object of this invention to be specifically enumerated herein is to provide a test brake including an actuator therefor adapted to be controlled from a remote location such as adjacent the free end of a lever arm removably secured to the stationary portion of the test brake.

Yet another object of this invention is to provide a test brake specifically adapted for use on small air cooled internal combustion engine of the type including finned flywheels and with the test brake including means by which at least some of air drawn into the finned flywheel will be caused to pass in close proximity to the coacting braking surfaces of the test brake.

A final object of this invention to be specifically enumerated herein is to provide a test brake in accordance with the preceding object which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a conventional form of limited capacity air cooled internal combustion engine with the test brake of the instant invention operatively associated with the output shaft of the shaft and the finned flywheel of the invention;

FIGURE 2 is an enlarged fragmentary vertical sectional view taken substantially upon the plane indicated by the section line 2—2 of FIGURE 1;

FIGURE 3 is a fragmentary horizontal sectional view taken substantially upon the plane indicated by the section line 3—3 of FIGURE 2;

FIGURE 4 is an exploded perspective view of the test brake minus its actuator control;

FIGURE 5 is an elevational view of the actuating control for the test brake;

FIGURE 6 is a side elevational view of the starter cord pulley portion of the test brake with the brake drum mounted thereon and with portions of the brake drum and pulley being broken away so as to illustrate the manner in which these components are removably secured together.

Referring now more specifically to the drawings the numeral 10 generally designates a conventional form of air cooled internal combustion engine including an output shaft 12, see FIGURE 2, having a tapered portion 14 upon which is finned flywheel 16 is disposed. The shaft 12 includes an externally threaded upper end portion which projects above the flywheel 16 and which conventionally has a flywheel nut (not shown) threadedly engaged thereon for removably retaining the flywheel 16 on the shaft 12.

The test brake attachment is generally referred to by the reference numeral 20 and includes a starter cord pulley 22 provided with a central bore 24 slightly larger in diameter than the externally threaded end portion 18 whereby the pulley 22 may be telescoped over the end portion 18 after the aforementioned flywheel nut has been removed. A cylindrical brake drum 26 is provided and is secured to the upper side of the pulley 22 by means of threaded fasteners 28 passed upwardly through bores 30 formed in the pulley 22 and threadedly engaged in threaded bores 32 formed in and opening outwardly of the lower end of the brake drum 26. The brake drum 26 includes a downwardly opening internally threaded blind bore 34 registered with the bore 24 and in which the externally threaded end portion 18 of the shaft 12 is threadedly receivable. In this manner, the brake drum 26 comprises a replacement for the aforementioned flywheel nut and is utilized to secure the assembly comprising the starter cord pulley 22 and the drum 26 on the shaft 12 above the flywheel 16.

The flywheel pulley 22 includes the usual notch 36, see FIGURE 1 with which an associated starter cord may be engaged and a plurality of circumferentially spaced and extending slots 38 which are registered with the radial innermost ends of the radial cooling fins 40 on the flywheel 16, at least portions of the slots 38 being disposed radially outwardly of the lower end of the brake drum 26.

A sleeve 42 is provided and telescoped over the upper end of the brake drum 26. The sleeve 42 includes an upper end wall 44 closing the upper end of the sleeve 42 but provided with cooling air inlet apertures 46 spaced circumferentially thereabout. The upper end wall 44 includes a centrally disposed upwardly extending projection 48 having a non-circular upwardly opening recess 50 formed therein and the sleeve 42 includes a downwardly opening centrally disposed blind bore 52 extending upwardly into the projection 48 but opening downwardly through the inner surface of the end wall 44. The brake drum 26 includes an upwardly opening blind bore 54 registered with the lower end of the bore 52 and an axle pin 56 has one end thereof disposed within the bore 54 and the other end thereof disposed within the bore 52 so as to journal the upper end of the sleeve 42 from the brake drum 26, a thrust washer 58 being disposed about the pin 56 intermediate the confronting upper and lower faces of the drum 26 and the end wall 44.

The pulley 22 also includes a pair of diametrically opposed smooth bores 60 registered with corresponding threaded bores 62 formed through the brake drum 26 and a pair of setscrews 44 are threadedly engaged in the bore 62 and extend downwardly through the bore 60 for engagement with a confronting end surface of the flywheel 16. The lower ends of the setscrews 64 are cupped so as to bite into the opposing surface of the flywheel 16 and therefore the assemblage including the starter cord pulley 22 and the brake drum 26 is locked to the flywheel 40 against rotation relative thereto.

The sleeve 42 includes a radial slot or opening 66 and one marginal edge portion of the sleeve 42 defining the slot 66 is provided with a pair of threaded bores 68. A circumferentially contractible band 70 is provided and includes a pair of brake lining sections 72 secured to its inner surface in any convenient manner and the sections 72 are spaced slightly apart as at 74 so as to define an inclined groove within the band 70. The band 70 is disposed about the drum 26 prior to the sleeve 42 being telescoped thereover and accordingly, the band 70 is disposed between the confronting surfaces of the sleeve 42 and the drum 26.

The band 70 includes a pair of radially outwardly projecting mounting ears 76 and 78 secured to its opposite ends and the ear 78 and the adjacent portions of the band 70 having locking screws 80 passed therethrough and threadedly engaged within the threaded bores 68 so as to lock the band 70 against rotation relative to the sleeve 42. In addition, the ears 76 and 78 project outwardly of the slot 66 and therefore also serve to prevent rotation of the band 70 relative to the sleeve 42.

A remote control assembly for the attachment 20 is provided and is generally referred to by the reference numeral 84. The assembly 84 includes a generally U-shaped handgrip comprising a pair of generally parallel flange portions 86 and 88 joined by means of an integral bight portion 90 extending between corresponding edges of the flange portions 86 and 88. The bight portion 90 includes a laterally struck tab portion 92 apertured as at 94 and an L-shaped actuating lever 96 is pivotally secured to the bight portion 90 by means of a pivot pin 98 and a friction washer 100 whereby oscillation of the lever 96 relative to the bight portion 90 may be adjustably frictionally resisted by adjusting the pivot fastener 98.

The lever 96 includes an apertured tab 102 which is registrable with the tab 92 and a Bowden cable assembly is provided for connecting the control assembly 84 to the band 70, the Bowden cable assembly being generally referred to by the reference numeral 104 and including an outer casing 106 extending between the tab 92 and the ear 78. A flexible inner core 108 extends through the outer casing 106 and has one end thereof secured to the tab 102 by means of an anchor 110 and the other end thereof secured through the ears 78 and 76 by means of an anchor 112. Thus, upon movement of the free end of the lever 96 toward the flange portion 88, the band 70 is circumferentially contracted about the brake drum 26 and the brake lining section 72 are brought into frictional engagement with the outer surfaces of the drum 26 so as to frictionally couple the sleeve 42 to the brake drum 26 for rotation therewith. However, when one end portion of a lever arm 116 provided with a non-circular projection 118 has its projection 118 engaged in the recess 50 and a person holds the outer end of the lever arm 116, the sleeve 42 may be held reasonably stationary relative to the engine 10 and thus the attachment 20, when actuated, operates as an adjustable brake for placing a load on the output shaft 12.

During operation of the test brake attachment 20, a reduced pressure area is formed at the inner ends of the fins 40 of the flywheel 16 and thus cooling air is drawn downwardly through the apertures 46, the slot or groove 74 and the slots 38 during rotation of the flywheel 16. This cooling air is passed in intimate contact with the external surfaces of the brake drum 26 and the internal surfaces of the brake lining sections 72 and therefore serves to cool these frictionally engaged surfaces during operation of the attachment 20.

Of course, the attachment 20 is not limited to being used on an internal combustion engine and may also be used on small capacity electric motors and the like to apply a load to the output shaft thereof in order that tests determining the operation of such motors while under load may be undertaken.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a rotatable shaft having a free end, drum means including outer brake surface portions removably mounted on said shaft for rotation therewith, a sleeve generally concentrically disposed about said drum means and adapted to be stationarily poistioned for rotation of said shaft and drum means relative thereto, a circumferentially contractable split brake band including an inner surface defining a brake lining surface and disposed within said sleeve and about said drum means, means connecting said band to said sleeve for preventing uncontrolled rotation of said band relative to said sleeve, and means connected to said band for selectively circumferentially contracting the latter about said drum means, a centrifugal blower wheel provided with circumferentially spaced generally radially extending cooling fins, said wheel being mounted on said shaft with said free end projecting through said wheel, said drum means being mounted on said free end of said shaft, said band being disposed adjacent said wheel and including generally axially extending inwardly opening cooling air grooves spaced circumferentially thereabout and registered with at least certain areas between the inner end portions of adjacent fins on said wheel, said grooves, upon rotation of said blower wheel and said drum means relative to said band, being operable to duct air therethrough to said areas for cooling the exterior surface portions of said drum means opposing said grooves and thereby allowing said cooled exterior surface portions to absorb greater quantities of heat from said brake lining surface.

2. The combination of claim 1 wherein said drum means is mounted on said free end of said shaft and said drum means and said sleeve include coacting bearing means journalling said sleeve on said drum means.

3. The combination of claim 1 wherein said sleeve includes a longitudinally extending slot, said means connecting said band to said sleeve including at least one generally radially outwardly projecting portion of said band projecting into said slot.

4. The combination of claim 1 wherein said means connecting said band to said sleeve includes means securing one end portion of said band to an adjacent portion of said sleeve.

5. The combination of claim 1 wherein said shaft comprises a driven shaft.

6. The combination of claim 1 wherein said shaft comprises the output shaft of a small capacity air cooled internal combustion engine.

7. The combination of claim 1 wherein said drum means is mounted on said free end of said shaft and said drum means and said sleeve include coacting bearing means journalling said sleeve on said drum means; said sleeve including an end wall enclosing said free end of said shaft within said sleeve, said end wall including means adapted to have one of a lever arm removably connected thereto for manually maintaining said sleeve stationary.

8. The combination of claim 7 wherein said means connected to said band for contracting the latter includes an actuator portion operatively connected to said band by an elongated flexible member thereby enabling said actuator portion to be operated from the end of said lever arm remote from said sleeve.

References Cited

UNITED STATES PATENTS

| | | | |
|---|---|---|---|
| 442,346 | 12/1890 | Wright | 192—80 |
| 1,193,366 | 8/1916 | Demara | 188—77 |
| 3,290,871 | 12/1966 | Haas | 188—77 X |

GEORGE E. A. HALVOSA, Primary Examiner

U.S. Cl. X.R.

188—264; 192—80